UNITED STATES PATENT OFFICE.

F. KUHLMANN, OF LILLE, FRANCE.

IMPROVEMENT IN VEHICLES FOR PAINT COMPOUNDS.

Specification forming part of Letters Patent No. 15,520, dated August 12, 1856.

*To all whom it may concern:*

Be it known that I, FREDERIC KUHLMANN, professor of chemistry, of Lille, in the Empire of France, have invented certain Materials to be used for Painting, Printing, Varnishing, Writing, Gilding, and other Analogous Purposes; and I do hereby declare that the following is a full, clear, and exact description of the same.

My invention consists in the application of alkaline silicates, or of several silicates with different bases, to cementing, painting, printing, and dressing or finishing fabrics. The silicate which I prefer using as being the most economical to prepare when it is applied as a solution is silicate of potash, which is or may be obtained by heating silica during six or eight hours in a solution of caustic potash having a specific gravity of 1.160° about, the temperature being that corresponding with a pressure of five or six atmospheres. Instead of potash, I also sometimes use caustic soda; but this latter is more liable to produce white efflorescences on the paintings, especially if the silicious compound be not thoroughly saturated with silica. The vessel which I use for the said preparing operation is a strong cylindrical steam-boiler. The silica is kept from the bottom of the boiler by means of a diaphragm of perforated sheet-iron, and by using silex or pieces of common gun-flint, such as they are found in chalk formations, the calcareous matter adhering to the same having previously been got rid of by washing with dilute muriatic acid, it will be found that the solution is effected without any sediment settling at the bottom of the boiler. When sand is used it will be advisable to employ some mechanical means of stirring or agitating; but I generally prefer using gun-flint, either in its native state or else after having disintegrated the same by chilling it in cold water when red-hot. However, all silicious matters may be used and yield solutions that are more or less colorless. The solutions thus obtained are sufficiently thick or dense to be used at once, and it is even necessary to weaken them for very siccative or fast-drying paints or colors. On the contrary, when it is desired to produce a varnish the solution is still further concentrated. The silicate may also be prepared in the dry process. The operation in this case is carried on in a reverberatory furnace by using one and one-third or two parts of silicate to one part of carbonate of potash, and I heat the whole during six or seven hours till a complete fusion is obtained. This *modus operandi* may be objected to when used for making solutions for painting, on account of certain sulphurets remaining present, which cause several colors to grow black or dark; but this may be obviated by melting the compound in a crucible and adding a small portion of nitrate of potash to the mixture of silica and of potash.

The solutions of alkaline silicate which form the base of my new or improved paints are reduced to the proper liquid consistency for being used with the brush by mixing said solutions with the greater part of mineral colors or pigments, either natural or artificial, that are at present in use, excepting, of course, those that are altered by the presence of the alkali—as Prussian blue, for instance. Some colors of the same kind are difficult to apply, and require great precautions, being rather strongly attacked by the solution of silicate of potash, and by partially combining with silica—for instance, white lead, chromate of lead, &c. These latter kind of colors must therefore be used with weaker solutions or else in conjunction with substances having a less affinity for silica.

It may also be observed that even the more insoluble kind of colors are attacked a little by the silicate. Among these we have the artificial or natural sulphate of barytes, which forms an exceedingly white and cheap base, and agrees very well with the silicate by thoroughly uniting with it. Although this white base does not cover quite so well as white lead, yet it is preferable on account of the low price at which it can be obtained.

When the improved paints are used the surface or object to which the paint is applied must sometimes be filled up or cemented the same as when oil, turpentine, gelatine, starch, &c., are used. For this purpose I form a cement or mastic from the same solution, which is concentrated for the purpose, and compounded with fast-drying substances—such as white lead, artificial carbonate of barytes, phosphate of lime, chalk, ocher, oxide of manganese, oxide of iron, &c.—the mixture being applied to the joints.

The silicate colors above described may be rubbed over or smoothed down with pumicestone. They can also be laid on in several layers, and covered with a varnish that is made with a dilute solution of the same silicate as has been used for making the paint itself. The silicious paints may not only be applied to stone and wood, but also to metals, glass, and porcelain. These colors, sticking very satisfactorily to metallic surfaces—ocher, oxide of manganese or oxide of iron, and silicate—may be used to preserve the iron from rust instead of minium (red lead) and linseed-oil. Also, by applying successive layers of a mixture of silicate and artificial sulphate of barytes upon brightened surfaces of cast-iron a very durable and hard kind of enamel is obtained that can be vitrified by heat, if required. Oxide of manganese may be used in the same way, and gives a black enamel of a superior description.

The silicate colors produce remarkably fine results when applied to glass-painting, and the pigments which I chiefly make use of for that purpose are transparent or opaque enamels, which are reduced to fine powder. All the other colors and also organic gum-lac colors are equally applicable; but these latter are liable to get changed by the presence of free alkali, and are less solid than mineral colors.

I also sometimes form an imitation of dull ground glass by applying artificial or natural sulphate of barytes and the soluble silicates on glass either cold or vitrifying the same by heat, so as to produce a white enamel.

The processes above described for glass-painting are equally applicable to porcelain, which may be ornamented with the most varied and elegant colors, either when it is enameled or not, (*biscotto*,) the painting in the latter case being coated over with silicated varnish or enamel.

In any of the applications above set forth the varnish or enamel after some time becomes insoluble in water, even if it be boiling. This insolubility may still further be insured by the addition of the coloring oxides or of a small quantity of artificial carbonate of barytes, which is dissolved in it at a gentle heat. In some cases, when the colors are not very siccative, they may be rendered more insoluble by washing the painting after it has hardened with a dilute solution of hydrofluosilicic acid, which fixes the potash. However, this means need but very seldom be resorted to. The paintings may be made still more insoluble by washing them with a weakened solution of muriate of ammonia.

My new black colors or pigments which are made with lamp-black are as homogeneous or mix as well as the others. In these colors there is no danger of a double silicate forming. It will also be found useful to increase the drying powers of the silicate by adding a little artificial carbonate of barytes. The same precautions may be taken with respect to other colors that are not very liable to be attacked by the alkaline silicate. These black colors may also be used as printers' ink, giving a very fine and durable letter-press. As the silicated ink, however, is liable to get thick soon under the roller, a little treacle may be mixed with it to facilitate the work.

Instead of black colors, any others may equally be applied to paper. Also, by printing a colorless and concentrated silicious solution on the paper I prepare the same for gilding and silvering; or the silicious solution may be used for fixing on paper and other surfaces thin leaves of metal, which are rendered adhesive merely by slightly damping them with saliva or some gummy liquid.

The process as described with regard to letter-press printing are also applicable to the manufacture of papers for hanging rooms, &c.

The same means and processes may also be applied to fixing on fabrics certain adjective colors—such as ultramarine—and for printing on fabrics any lac colors of organic origin which give tolerably solid designs.

The colors may be fixed by using in suitable proportions any of the above substances employed for rendering the silicated painting insoluble; or any salt which decomposes the silicate that is still soluble answers the same purpose.

The silicious solution is also employed as the base of a most unalterable writing-ink. For this purpose I prepare a liquid of a brownish-black by boiling pieces of old leather with a solution of caustic soda or potash, and this alkaline solution is then saturated with silica that is in a state of jelly, and if a deeper black is to be given to the ink carbonaceous ingredients of india-ink must be added.

What I claim as my invention, and desire to secure by Letters Patent, is—

The admixture of silicate of alkali in substance with a paint, varnish, ink, or dye, (instead of using it in layers or coatings, as heretofore done,) using for the protection of the several individual coloring-matters such agents as are known to scientific or practical chemists and which have been described in this specification.

FRED. KUHLMANN.

Witnesses:
GARDISSAL,
C. MAC RAE.